(12) United States Patent
Chen et al.

(10) Patent No.: US 10,481,469 B2
(45) Date of Patent: Nov. 19, 2019

(54) CAMERA SHUTTERS

(71) Applicant: Hewlett-Packard Development Company, L.P., Houston, TX (US)

(72) Inventors: Chih Chien Chen, Taipei (TW); Ming-Shan Tsai, Taipei (TW); Hai-Lung Hung, Taipei (TW)

(73) Assignee: Hewlett Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/544,921

(22) PCT Filed: Mar. 26, 2015

(86) PCT No.: PCT/US2015/022658
§ 371 (c)(1),
(2) Date: Jul. 20, 2017

(87) PCT Pub. No.: WO2016/153512
PCT Pub. Date: Sep. 29, 2016

(65) Prior Publication Data
US 2018/0004068 A1 Jan. 4, 2018

(51) Int. Cl.
*G03B 7/10* (2006.01)
*G03B 9/08* (2006.01)
(Continued)

(52) U.S. Cl.
CPC ............ *G03B 11/041* (2013.01); *G03B 9/08* (2013.01); *G03B 11/043* (2013.01); *G03B 7/10* (2013.01);
(Continued)

(58) Field of Classification Search
CPC ... G03B 9/08; G03B 9/14; G03B 9/22; G03B 11/043; G04B 7/10
(Continued)

(56) References Cited

U.S. PATENT DOCUMENTS 2,571,756 A * 10/1951 Pribus ............... G03B 9/10
396/493
2005/0135800 A1 * 6/2005 Nguyen ............. G03B 7/10
396/463
(Continued)

FOREIGN PATENT DOCUMENTS

CN 2789825 Y 6/2006
CN 201402424 Y 2/2010
(Continued)

OTHER PUBLICATIONS

Amazon—"Webcam cover for laptops/pad devices"—Jun. 30, 2017—6 pages.

*Primary Examiner* — Clayton E. LaBalle
*Assistant Examiner* — Kevin C Butler
(74) *Attorney, Agent, or Firm* — HP Inc. Patent Department (57) ABSTRACT

An example shutter assembly for protecting cameras, such as webcams, integrated into computing devices is disclosed. The shutter assembly includes an actuator element and shutter element. The actuator element can rotate an axis to pivot the shutter element into and out of the field of view of the camera assembly. The actuator can extend through or be otherwise accessible through the housing of the computing device so that the shutter can move in a plane parallel to the front surface or bezel of the computing device. Because the shutter element operated from a surface other than the front facing surface, the bezel can include a single surface with a window to protect the camera assembly and allow for a touch control capabilities. The shutter element can be disposed between the bezel and the camera assembly to provide privacy from the camera being inadvertently or maliciously activated.

20 Claims, 6 Drawing Sheets

(51) Int. Cl.
*G03B 9/10* (2006.01)
*G03B 9/14* (2006.01)
*G03B 9/22* (2006.01)
*G03B 11/04* (2006.01)
*G03B 21/14* (2006.01)

(52) U.S. Cl.
CPC .................. *G03B 9/10* (2013.01); *G03B 9/14* (2013.01); *G03B 9/22* (2013.01); *G03B 21/142* (2013.01)

(58) Field of Classification Search
USPC ......................................................... 396/463
See application file for complete search history.

(56) References Cited

U.S. PATENT DOCUMENTS

| | | | | |
|---|---|---|---|---|
| 2007/0242949 | A1* | 10/2007 | Ryynanen | G03B 11/043 396/463 |
| 2010/0102979 | A1* | 4/2010 | Huang | G06F 1/1616 340/686.1 |
| 2011/0058255 | A1* | 3/2011 | Weiss | H04M 1/0264 359/511 |
| 2012/0075521 | A1* | 3/2012 | Tsai | G03B 9/36 348/367 |
| 2014/0220269 | A1* | 8/2014 | Ogufere Ogufere | B44C 5/005 428/34.1 |
| 2016/0023778 | A1* | 1/2016 | Zhao | B64D 47/08 396/12 |
| 2018/0004068 | A1* | 1/2018 | Chen | G03B 11/041 |

FOREIGN PATENT DOCUMENTS

| | | | |
|---|---|---|---|
| CN | 202093450 U | 12/2011 | |
| CN | 202472483 U | 10/2012 | |
| CN | 203397262 U | 1/2014 | |
| CN | 104122951 A | 10/2014 | |
| JP | H07270859 | * 10/1995 | ............... G03B 9/10 |
| JP | 2003-344975 A | 12/2003 | |
| JP | 3504718 B2 | 3/2004 | |
| JP | 2010-072318 A | 4/2010 | |
| WO | WO-2014/029897 A1 | 2/2014 | |

* cited by examiner

CAMERA SHUTTERS

BACKGROUND

Computing devices often include integrated still or video cameras that can feed or stream images to a communication network—popularly, such devices are referred to as "webcams." For instance, a webcam may be integrated into the bezel of a computing device's display.

BRIEF DESCRIPTION OF THE DRAWINGS

FIGS. 2A, 26, and 2C illustrate an example configuration of a shutter assembly installed the housing of computer device with an integrated camera assembly.

FIGS. 3A and 3B illustrate views of an example single piece shutter assembly.

DETAILED DESCRIPTION

The present disclosure broadly discloses a shutter assembly for bezel-integrated webcam and other camera assemblies. Some webcams include a shutter to provide privacy. When the user does not wish for the webcam to transmit images, the shutter can be moved to cover the camera lens, thus blocking its field of view. Some shutters are opened and closed by an actuator on the front facing surface of the bezel of the computing device. For example, the shutter can include simple movable slider that a user can move in and out of the field of view of the camera. The presence of such sliding shutters can limit design possibilities of the front bezel and/or the computing device, and can also expose the camera assembly to damage and contamination when accidentally touched by a user's fingers. When the bezel includes a single piece of glass, the bezel can include display and touch capabilities. Efforts to eliminate the presence of front facing bezel-controlled shutters can introduce both manually and automatically operated mechanisms as well as additional costs and manufacturing steps.

Examples of the present disclosure provide a novel webcam shutter. For instance, examples of the present disclosure provide a one piece shutter assembly. The shutter assembly can include an actuator element and a shutter element. The actuator element can include a mounting element dimensioned to match a corresponding internal mounting element of the bezel or housing assembly of the computing device. Some portion of the actuator element can be accessible from the exterior of the housing assembly so that a user can manually rotate the actuator to move the shutter element into and out of the field of view of the camera mounted in the front facing surface of the bezel. In various implementations, the actuator element and the shutter elements can rotate about an axis orthogonal to the front surface of the bezel and/or parallel to the optical axis of the camera or lens. The one piece shutter assembly simplifies manufacture, installation and maintenance of the shutter, accommodates thin device form factors, and allows for increased functional flexibility in bezel design.

As used herein, the term "parallel" refers to any angular orientation that is or near zero degrees. Accordingly, parallel can refer to any small angular orientation difference including acute angles (e.g., less than 45 degrees). Similarly, the terms "orthogonal" and "perpendicular" are used herein to refer to any angular orientation that from approximately 45 to 90 degrees.

Figure 1:
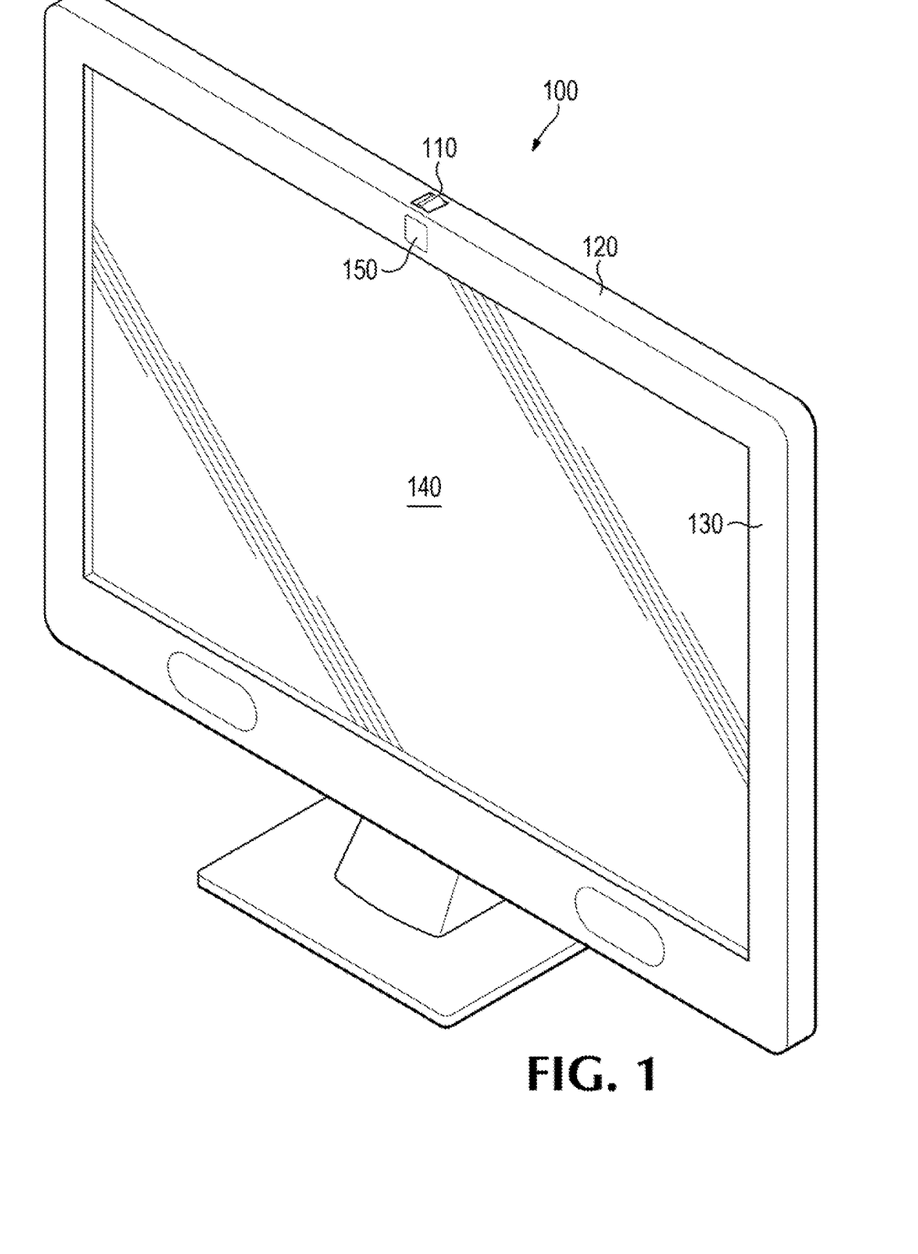
FIG. 1 illustrates an example computing device having an integrated camera assembly.

FIG. 1 illustrates an example shutter assembly 110 of the present disclosure in an example device 100. As shown, the device 100 can include any display device or other device that includes a display device 140 (e.g., an LED or LCD flat panel display). For example, device 100 can include a computer monitor, an all-in-one computer, a laptop computer, a tablet computer, or the like. Device 100 can include a housing assembly 120. The front of the housing assembly 120 can include or be coupled to a front facing bezel 130. The bezel 130 can surround and/or support the display device 140 and include other components. In some implementations, the bezel 130 can include a single piece of material, such as glass or plastics. In such implementations, the bezel can be fully or partially transparent and/or include various display components (e.g., light emitting diodes or "LEDs", liquid crystal displays or "LCDs", etc.) and control components (e.g., resistive, capacitive, or inductive touch sensitive devices or touchscreens).

In some example implementations, the bezel can include a window 150 through which a camera assembly integrated into the housing assembly 120 can capture images. As shown, the one piece shutter assembly 110 can be dimensioned and mounted within the housing assembly 120 so that the actuator element is accessible through an external surface of the housing assembly 120. The actuator element of the shutter assembly 110 can rotate about an axis orthogonal to the front facing bezel surface 130 to rotate or pivot a shutter element in a plane that intersects the optical axis of the camera assembly. As such, the shutter element can be rotated into and out of the window 150 to selectively expose or occlude the field of view of the camera assembly.

In some implementations, the housing assembly 120 and the front facing bezel 130 can be formed as a single integrated unit, however, the housing assembly 120 can also include multiple components and materials. For example, the front facing bezel 130 can include a glass or other transparent material, while the top, sides, bottom, and back of housing assembly 120 can include an opaque plastic material. Use of glass or other transparent or specular material for the front facing bezel 130 provides for a streamlined and integrated appearance of the device 100.

Figures 2A, 2B:
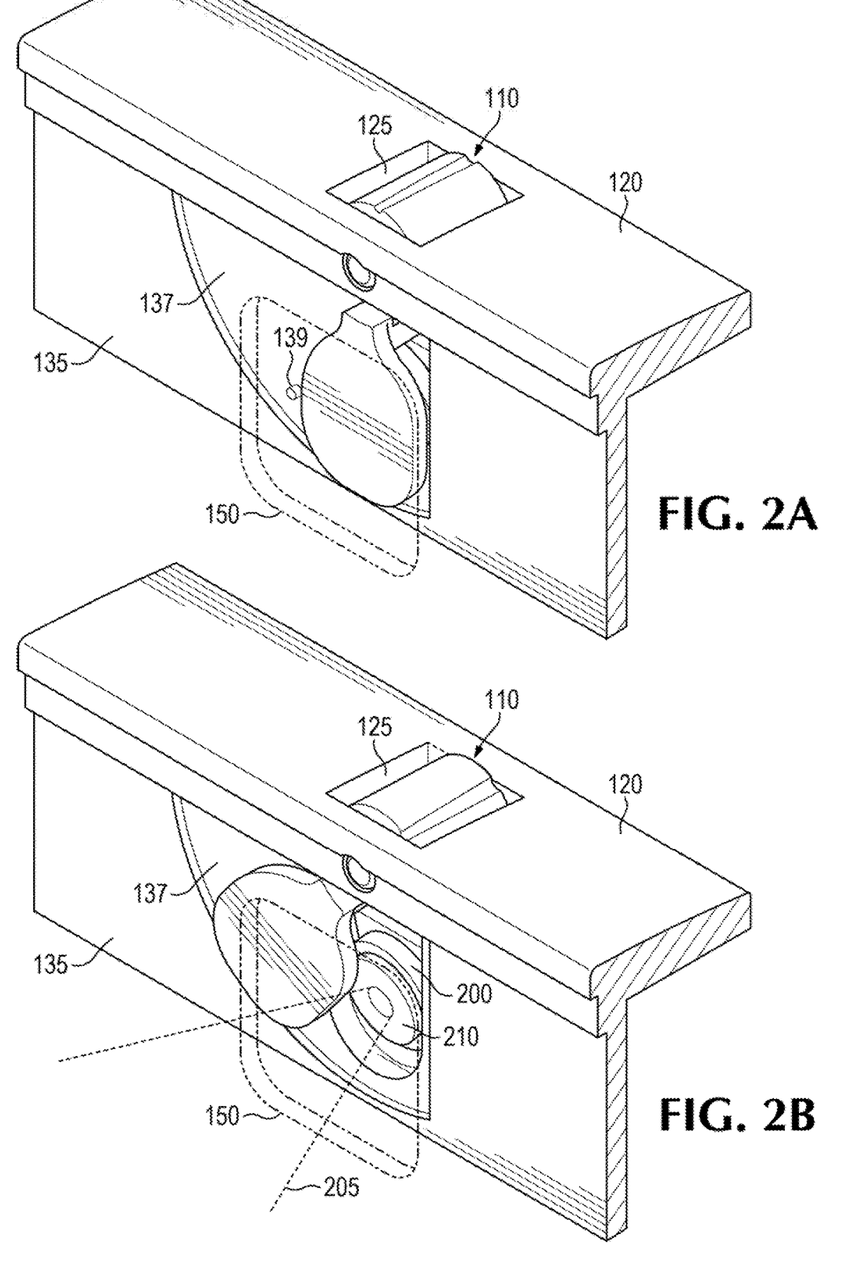

FIGS. 2A and 2B illustrate portions of the one piece shutter assembly 110 that are hidden from view or are not visible in their entirety in FIG. 1. FIG. 2A depicts the shutter assembly 110 in the "closed position", in which the shutter element of the shutter assembly 110 occludes the field-of-view 205 of the camera assembly 200. FIG. 2B depicts the shutter assembly 110 in the "open position", in which the shutter element of the shutter assembly 110 is disposed in a position in which it does not occlude the field-of-view 205 of the camera assembly 200.

The camera assembly 200 can be coupled to element 135 of the housing assembly 120 so that it is forward facing relative to the front of the device 100 and/or the display device 140. In such implementations, the camera assembly 200 can be disposed in an opening of the element 135. Accordingly, the optical axis of the lens 210 can be perpendicular to the plane of the bezel 130, element 135, or display device 140. Alternatively, the optical axis of the lens 210 can be at an acute angle relative to a direction perpendicular to the bezel 130, element 135, or display device 140. In some implementations, the optical axis of the lens 210 and/or the camera assembly 200 may be adjustable. Accordingly, in such implementations, the field-of-view 205 can be directed to point in any direction independent of a front facing plane of the device 100.

As discussed above, the shutter assembly 110 can be coupled the top of the housing assembly 120 of the device 100 and/or another element, such as element 135, of the housing assembly 120. In various example implementations, the element 135 can include a surface that is disposed and/or coupled to the top of the housing assembly 120 at an angle. For example, the element 135 can be coupled to an internal surface of the housing assembly 120 at 90 degrees. In various example implementations, the element 135 of the housing assembly 120 can include a recessed region 137 to accommodate the thickness of the shutter element of the shutter assembly 110. The depth of the recessed region 137 can correspond to the thickness of the shutter element, such that the front surface of the shutter element is flush or substantially flush with the front surface of the element 135. In related implementations, the recess 137 can include a stop point 139 to limit the range of motion of the shutter element.

In such implementations, the rear surface of the shutter element can include a corresponding channel to accommodate the stop point 139. The channel on the rear surface of the shutter element can include a closed end with which to engage the stop point 139. Additional details of the rear surface of the shutter element of the shutter assembly 110 are described below in further detail in reference to FIGS. 3A and 3B.

In the example shown, element 135 can include a front facing surface to which the bezel 130 can be coupled. Accordingly, the element 135 of the housing assembly 120 can support the bezel 130 to add additional support or to hold the display device 140 (e.g., the bezel 130 may include a glass or other transparent material with limited structural capabilities). In implementations in which the bezel 130 and the element 135 are individual units, the bezel 130 can include an opening or window 150. The placement of the window 150 can correspond to the placement of the camera assembly 200 in housing assembly 120.

In other implementations, element 135 and the bezel 130 can be the same element. In such implementations, the window 150 can include a transparent section through which the camera assembly 200 can capture images. For example, the bezel 130 can include a glass material with an opaque backing except in the region corresponding to the window 150. In such implementations, the shutter element of the shutter assembly 110 can move in between and parallel to the bezel 130 and the element 135 and/or the camera assembly 200 to selectively cover and uncover the camera assembly 200.

Figures 2C, 3A, 3B:
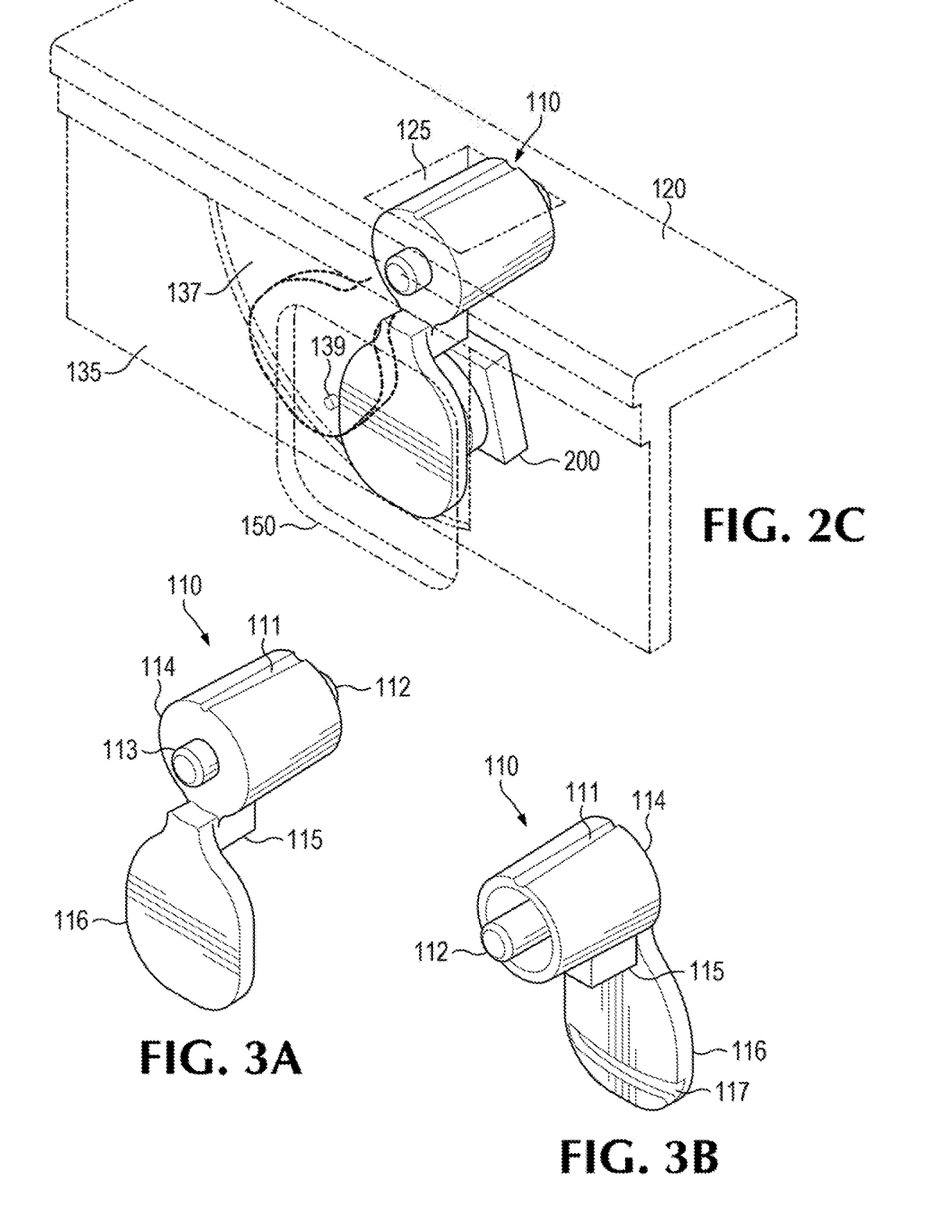

FIG. 2C depicts another view of the shutter assembly 110 that depicts the movement of the shutter assembly 110 from an open position to a closed position.

FIGS. 3A and 3B depict detailed views of the shutter assembly 110. As shown in FIGS. 3A and 3B, the shutter assembly can include an actuator element 114 coupled to a shutter element 116 by a coupling element 115. In some example implementations, the shutter element 116 and/or the coupling element 115 are disposed at the perimeter of the actuator element 114. As shown in the example shown, the shutter element 116 can be coupled to perimeter surface of the cylindrical body of the actuator element 114. While the actuator element 114, shutter element 116, and coupling element 115 are referred to herein as individual components of the shutter assembly 110 for the sake of clarity, implementations of the present disclosure contemplate that the shutter assembly 110 can be formed as a single integrated unit. For example, the shutter assembly 110, including the shutter element 116, the coupling element 115, and actuator element 114 can be molded from a single integrated piece of plastic (e.g., using an injection molding process). Similarly, shutter assembly 110 can include any material that can be cast (e.g., aluminum, plastic, fiber composite, etc.) in a corresponding casting process. The single piece aspect of the shutter assembly can reduce the bill of materials for the device 100 and potentially result in reduced costs.

The actuator element 114 can include a front facing mounting element 113 and a rear facing mounting element 112. The front facing mounting element 113 can be dimensioned and positioned to engage the corresponding mounting element on bezel support element 135 and/or the housing assembly 120. Similarly, the rear facing mounting element 112 can be dimensioned and positioned to engage a corresponding mounting element on or in the housing assembly 120. In various example implementations, the mounting elements 112 and 113 can include a cylindrical body that extends beyond or is recessed below the corresponding front and rear faces of the body of the actuator element 114. As shown in the examples shown in the figures, the actuator element 114 can include a cylindrical, or other geometric prism shape, having a longitudinal axis perpendicular to element 135 and/or bezel 130. The diameter of the cylindrical body of the actuator element 114 can be dimensioned to greater than the thickness of the housing assembly 120 so that a portion of the actuator element 114 is accessible from the exterior of the device 100.

The body of the actuator element 114 can also include a friction element 111 to increase the friction between the actuator element 114 and a user's finger or hand. In the illustrated example, the friction element can include a groove in the external surface of the actuator element 114. In other implementations, the friction element can include knurls, bumps, multiple grooves, rubber material, and the like.

As depicted in FIGS. 3A and 3B, the actuator element 114 can include a cylindrical body having a diameter greater than the mounting elements 113 and 112. In other implementations, the actuator element 114 can include other faceted shapes (e.g., polygonal prisms). In such implementations, the friction element 111 can include the edges between the facets of the external surface of the actuator element 114.

FIG. 39 shows channel 117 in the rear surface of the shutter element 116 that can be positioned and dimensioned to engage the stop point 139. In such implementations, the motion of the shutter element 116 can move in a plane parallel to a plane orthogonal to the optical axis of the camera assembly 200.

In various implementations, element 135 can include a mounting elements dimensioned and shaped to couple with the shutter assembly 110. For example, the coupling between the element 135 and the mounting element 113 of the shutter assembly 110 can include an opening or hole in the element 135 to accept the mounting element 113.

In reference to FIGS. 2A, 2B, 2C, 3A, and 3B simultaneously, when the shutter assembly 110 is disposed in the corresponding mounting elements of the device 100, a portion of the actuator element of the shutter assembly 110 can protrude through an opening 125 and/or be situated at, above, or below the external surface of the housing assembly 120. The exposed portion of the actuator element of the shutter assembly 110 can be manually operated to rotate the shutter assembly 110 about a particular axis. For example, a user can rotate the shutter assembly 110 by manually moving the actuator element 114 about an axis of the actuator element 114 to open or close the shutter element. While the element 135, the recessed region 137, the stop point 139, and the channel 117 are illustrated so that the shutter element 116 will move to the left of the camera assembly in a counter-clockwise direction, it is possible for the configuration of the element 135, the recessed region 137, the stop point 139, and the channel 117 to be switched so the shutter element can move in the opposite direction (e.g., clockwise so the shutter element 116 moves to the right of the camera assembly 200).

Figures 4A, 4B:
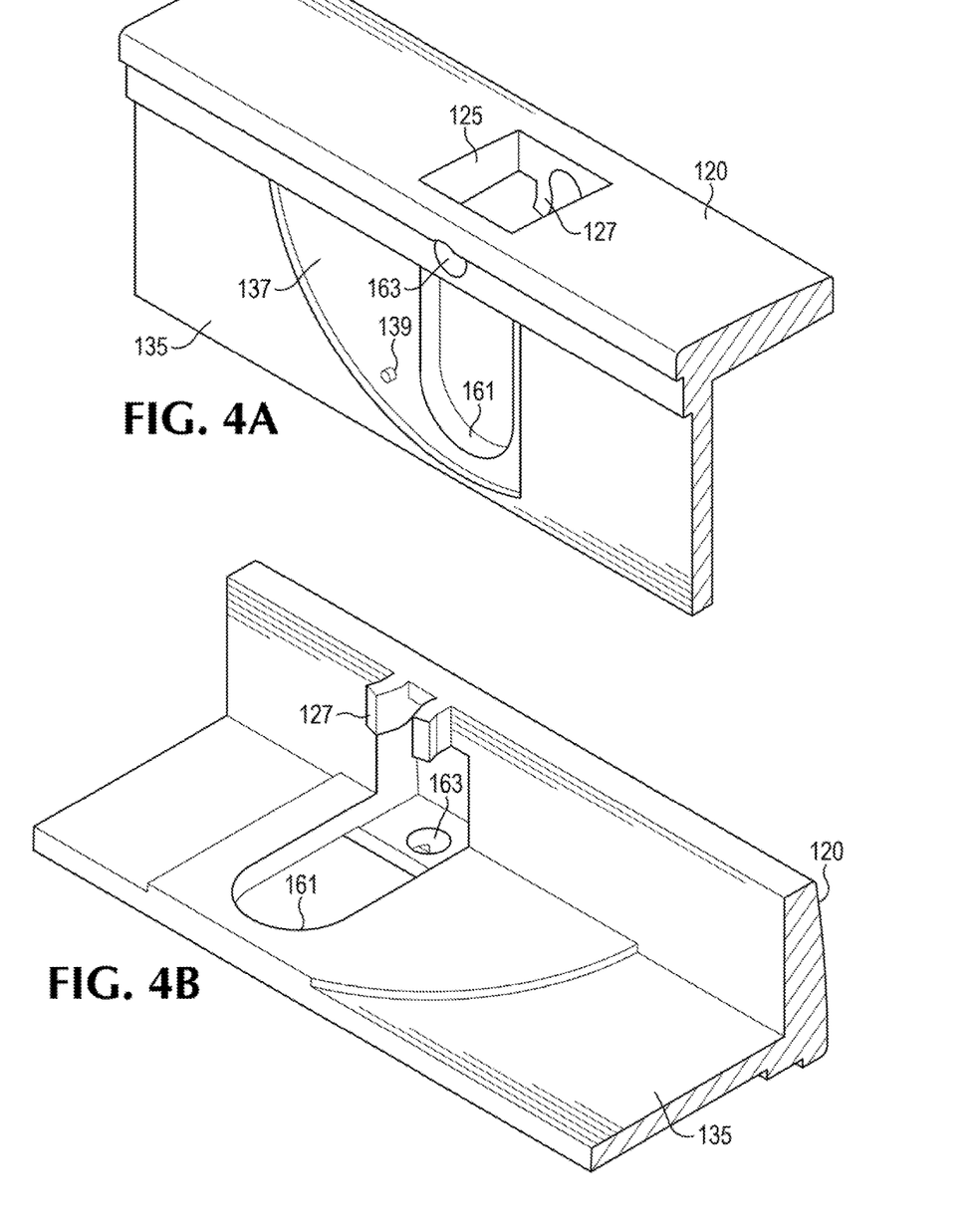
FIGS. 4A and 4B depict detailed perspective views of portions of an example computing device housing.

FIGS. 4A and 4B depict detailed external and internal views of sections of example housing assembly 120 and element 135. As shown, the bezel support element 135 can be a component of housing assembly 120. In some implementations, the bezel support element 135 and at least some portion of the housing assembly 120 can be formed as a single integrated unit. For example, the bezel support element 135 and housing assembly 120 can include a plastic or other moldable material and formed using an injection molding process.

FIG. 4A illustrates an example of the housing assembly 120 that includes a mounting element 127 at the posterior of opening 125 on the interior of housing assembly 120. FIG. 4A also illustrates an example placement of mounting element 163 that extends from the internal surface of element 135 to the external surface of element 135. In some implementations, the mounting element 163 is a hole or depression that extends from the interior surface of the housing assembly 120 or element 135 toward the front surface and dimensioned and positioned to couple with the shutter assembly 110.

FIG. 46 shows an interior view of the example housing assembly 120. In this view, the opening 161 through or in which the camera assembly 200 is disposed is shown relative to the mounting elements 127 and 163. In such implementations, the shutter element 116 of the shutter assembly can be dimensioned to match or be larger than the dimensions of the opening 161.

Figure 5A:
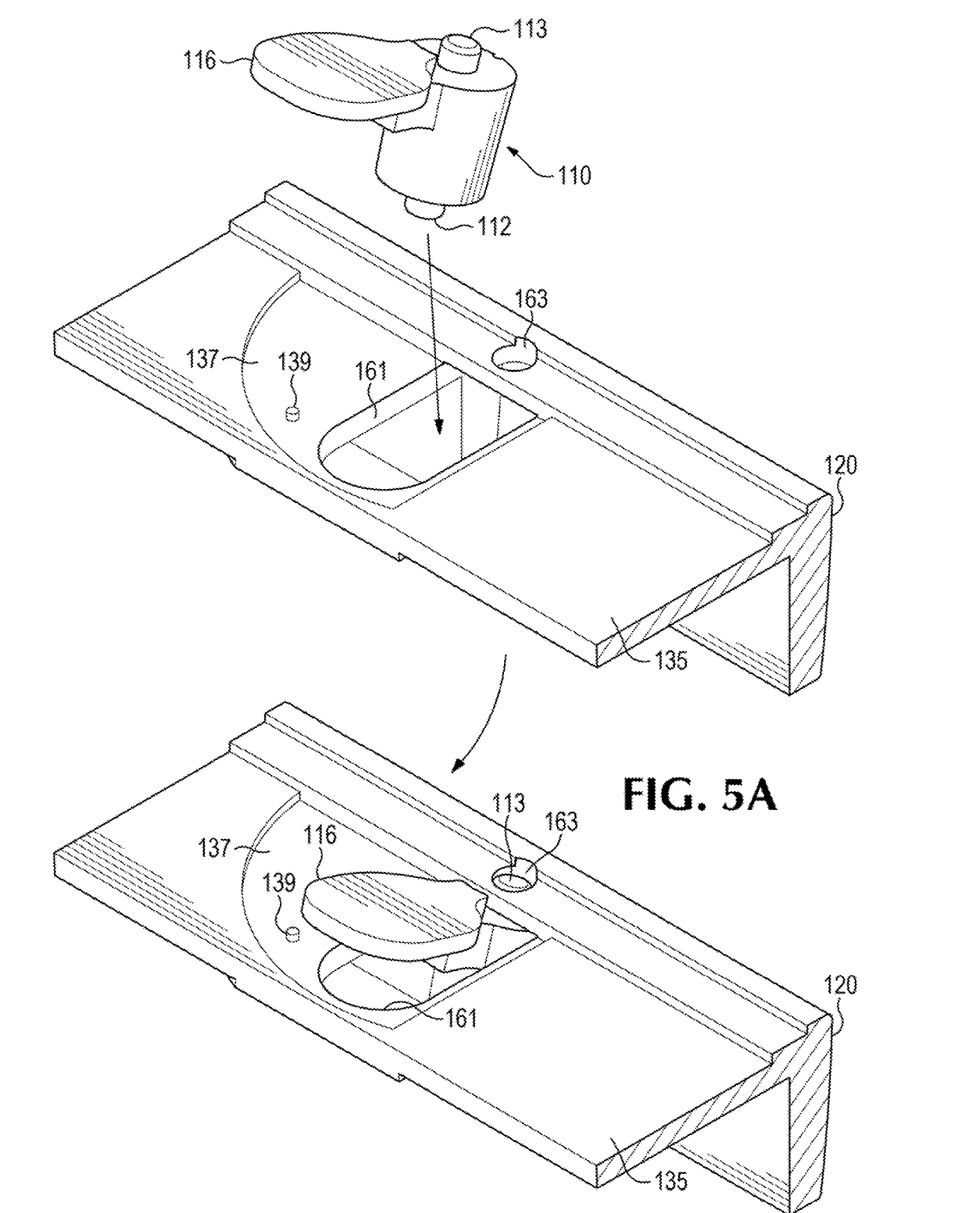
FIG. 5A illustrates the installation of an example shutter assembly into a housing of a computing device.
Figure 5B:
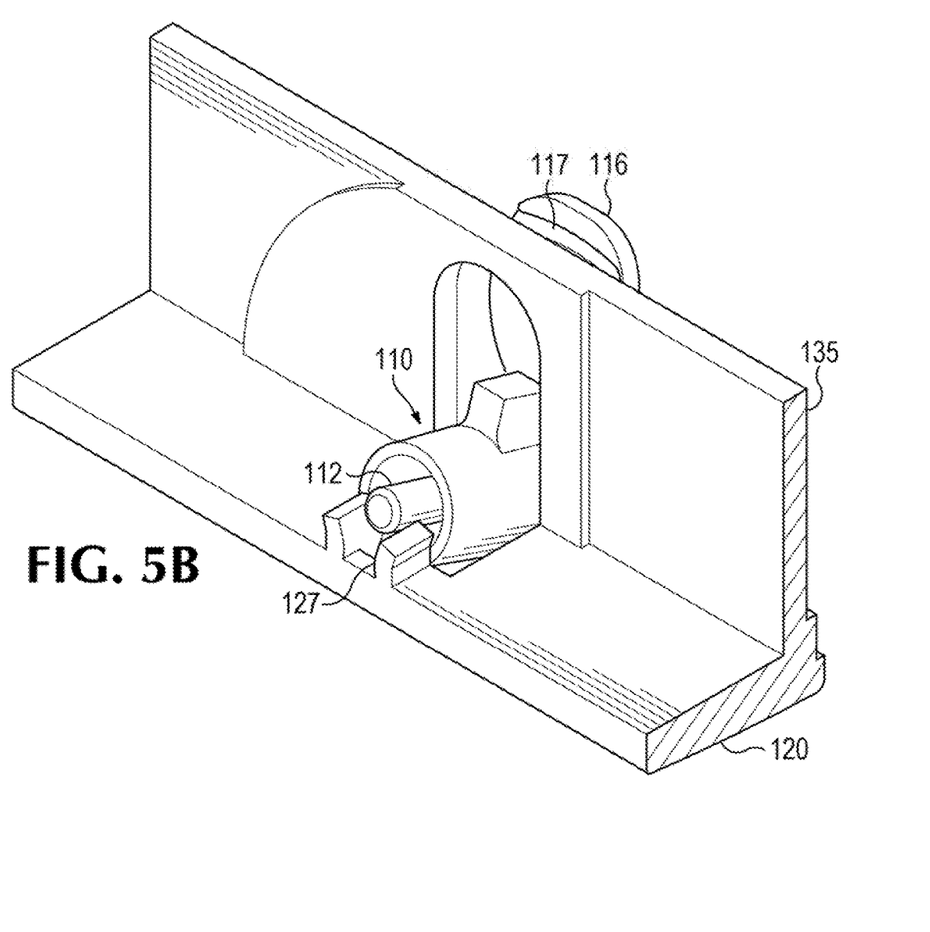
FIG. 5B illustrates an internal view of an example shutter assembly while being installed in a housing of a computing device.

In the view shown in FIG. 46 also illustrates the relative placement of the mounting elements 127 and 163. In the example shown, mounting element 127 can include a clip-type mounting structure to snap-fit or friction-fit with the rear facing mounting element 112 of the shutter assembly 110. Such a configuration can simplify the coupling of the shutter assembly 110 to the housing assembly 120. As illustrated in FIGS. 5A and 5B, the shutter assembly 110 can be installed as a single piece by inserting the front and rear facing mounting elements 113 and 112 of the shutter assembly 110 into the corresponding mounting elements 163 and 127.

In the example shown in FIG. 5A, the shutter assembly 110 can be maneuvered into position by inserting the actuator element 114 through the opening 161 from the direction of the front surface having the recessed region 137. The front facing mounting element 113 can then be positioned in the mounting element 163. With the front facing mounting element 113 in position, the rear facing mounting element of the shutter assembly can be snapped into position in the mounting element 127, as illustrated in FIG. 5B. With the corresponding mounting elements coupled to one another, a portion of the actuator element 114 of the shutter assembly 110 is accessible through the opening 125 of the housing assembly 120. Accordingly, the shutter element 116 of the shutter assembly 110 moves in response to movement of the actuator element 114.

Such implementations provide for a shutter that can be operated without any controls on the front facing (e.g., user facing) surface of element 135 or the corresponding bezel 130. In addition, because the shutter assembly 110 can be operated from the top or other surface of the housing assembly 120 to move the shutter element 116 between the bezel 130 and the camera assembly 200, the lens 210, or other elements of the camera assembly 200, are protected from potential contamination or damage (e.g., finger prints, dust, scratches, moisture, etc.). The bezel can be used as a protective element that has a window 150 instead of an opening that might be required if the controls to operate the shutter were located on a front facing surface of the device 100.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An apparatus, comprising:
   a shutter element to selectively cover a camera lens disposed in a housing assembly of a computing device, the shutter element pivotally mounted inside the housing assembly with the camera lens; and
   a manually operable actuator coupled to the shutter element to pivot the shutter element relative to the camera lens and the housing assembly, wherein manual rotation of the actuator in a first direction pivots the shutter element to cover the camera lens and manual rotation of the actuator in a second, opposite direction pivots the shutter element away from the camera lens.

2. The apparatus of claim 1, wherein the shutter element and the manually operable actuator are formed as a single integrated unit.

3. The apparatus of claim 1, wherein the manually operable actuator is rotatable about an axis parallel to an optical axis of the camera lens.

4. The apparatus of claim 3, wherein the shutter element is disposed relative to the manually operable actuator to pivot in a plane that intersects the optical axis of the camera lens.

5. The apparatus of claim 3, wherein the manually operable actuator comprises a cylindrical body element and the shutter element is coupled to a perimeter surface of the cylindrical body element.

6. The apparatus of claim 1, further comprising:
   a housing assembly comprising a first surface and a second surface coupled to the first surface at a first angle; and
   wherein the manually operable actuator is disposed in the first surface, and the shutter element is disposed in a recess of the second surface.

7. The apparatus of claim 6, wherein the recess comprises a stop corresponding the shutter element to limit the pivot of the shutter element.

8. The apparatus of claim 6, wherein the manually operable actuator comprises a cylindrical body having a longitudinal axis perpendicular to the second surface and a diameter greater than a thickness of the first surface.

9. The apparatus of claim 1, further comprising:
a stop positioned on one side of the camera lens; and
a channel in a rear surface of the shutter element, the channel having an open end to receive the stop, the stop sliding in the channel during pivoting of the shutter element, and the channel having a closed end that engages the stop to limit movement of the shutter element away from the camera lens.

10. The apparatus of claim 1, the manually operable actuator comprising a friction element to increase friction between the actuator and a user's finger to facilitate rotation of the actuator.

11. The apparatus of claim 10, wherein the friction element comprises a groove.

12. The apparatus of claim 1, the housing assembly comprising a clip mounting into which an end of the manually operable actuator snaps, the clip mounting allowing the manually operable actuator when received therein to pivot about a longitudinal axis.

13. An apparatus, comprising:
a computing device having a front bezel and a housing assembly;
a camera coupled to the housing assembly; and
a shutter assembly coupled to the housing assembly, wherein the shutter assembly comprises a cover and a manually operable actuator to pivot the cover in a plane parallel to the front bezel so that the cover intersects and blocks an optical axis of the camera thereby blocking field of view of the camera while the cover remains in the optical axis, a portion of the manually operable actuator extending from the housing assembly for selective rotation of the manually operable actuator by a user;
wherein the manually operable actuator is rotatable about an axis parallel to an optical axis of the camera.

14. The apparatus of claim 13, wherein the cover and the manually operable actuator are formed as a single integrated unit.

15. The apparatus of claim 13, wherein the front bezel comprises a transparent window element, and the cover is disposed between the window element and the camera.

16. The apparatus of claim 13, wherein the housing assembly comprises an integrated mounting element, and the shutter assembly is coupled to the housing assembly by the integrated mounting element.

17. The apparatus of claim 13, wherein the front bezel and the housing assembly are a single integrated unit.

18. An apparatus, comprising:
a computing device having a front bezel and a housing assembly;
a camera integrated into the housing assembly and directed through the front bezel;
a shutter assembly coupled to the housing assembly, wherein the shutter assembly comprises a shutter element and a manually operable actuator to pivot with the shutter element, causing the shutter element to pivot in a plane parallel to the front bezel and between the front bezel and the camera to intersect an optical access of the camera;
a stop positioned on one side of the camera; and
a channel in a rear surface of the shutter element, the channel having an open end to receive the stop, the stop sliding in the channel during pivoting of the shutter element, and the channel having a closed end that engages the stop to limit movement of the shutter element away from the optical access of the camera.

19. The apparatus of claim 18, wherein the front bezel comprises a transparent window disposed in front of the camera.

20. The apparatus of claim 18, the housing assembly comprising a clip mounting into which an end of the manually operable actuator snaps, the clip mounting allowing the manually operable actuator when received therein to pivot about a longitudinal axis.

* * * * *